United States Patent
Whitley et al.

(10) Patent No.: US 7,926,140 B2
(45) Date of Patent: Apr. 19, 2011

(54) SHIMLESS FRAME SUPPORT METHOD AND APPARATUS FOR DOCK LEVELERS

(75) Inventors: L. Blake Whitley, Arlington, TX (US); Richard K. Hoofard, Dallas, TX (US)

(73) Assignee: 4Front Engineered Solutions, Inc., Carrollton, TX (US)

( * ) Notice: Subject to any disclaimer, the term of this patent is extended or adjusted under 35 U.S.C. 154(b) by 558 days.

(21) Appl. No.: 11/783,964

(22) Filed: Apr. 13, 2007

(65) Prior Publication Data

US 2008/0250577 A1    Oct. 16, 2008

(51) Int. Cl.
*E01D 1/00* (2006.01)
(52) U.S. Cl. .................... 14/71.3; 14/71.1; 248/188.2
(58) Field of Classification Search ........... 248/188.2, 248/677, 678; 14/69.5, 71.1, 71.3
See application file for complete search history.

(56) References Cited

U.S. PATENT DOCUMENTS

| | | | |
|---|---|---|---|
| 400,033 A * | 3/1889 | Alliger | 248/188.2 |
| 2,877,875 A * | 3/1959 | Bolt | 52/713 |
| 4,118,817 A * | 10/1978 | Burnham | 14/71.3 |
| 4,453,282 A * | 6/1984 | Larsen | 14/71.1 |
| 4,784,364 A * | 11/1988 | Chamberlain et al. | 248/673 |
| 4,809,421 A * | 3/1989 | Justice | 29/525.02 |
| 4,923,157 A * | 5/1990 | Belamiza | 248/188.2 |
| 5,040,258 A * | 8/1991 | Hahn et al. | 14/71.3 |
| 5,546,623 A * | 8/1996 | Hahn | 14/69.5 |
| 5,673,881 A * | 10/1997 | Minchey et al. | 248/188.2 |
| 6,407,351 B1 * | 6/2002 | Meyer et al. | 177/238 |
| 6,543,733 B1 * | 4/2003 | Pennington | 248/149 |
| 6,643,880 B1 * | 11/2003 | Massey et al. | 14/71.3 |
| 6,931,686 B2 | 8/2005 | Hoofard et al. | |
| 7,225,493 B2 | 6/2007 | Hoofard et al. | |
| 7,309,051 B2 * | 12/2007 | McNeill | 248/188.2 |
| 7,409,739 B2 * | 8/2008 | Whitley et al. | 14/71.3 |
| 2006/0042030 A1 * | 3/2006 | Yoon et al. | 14/71.1 |

OTHER PUBLICATIONS

U.S. Appl. No. 11/347,206, filed Feb. 6, 2006, Whitley et al.

* cited by examiner

*Primary Examiner* — Gary S Hartmann
(74) *Attorney, Agent, or Firm* — Baker & Hostetler LLP

(57) ABSTRACT

A dock leveler frame includes a pit supported portion; a deck supporting portion configured to provide support to a deck portion of the dock leveler; and a fastener configured to contact corresponding structure on the pit supported portion and deck supporting portion, the corresponding structure configured to allow the pit supported portion and deck supporting portion to be fastened to each other via the fastener at multiple positions with respect to each other. A method of configuring a dock leveler frame to install a dock leveler in a pit and have a level deck without the use of shims includes: providing a pit supported portion of a dock lever frame; placing a deck supporting portion of the frame is a desired position with respect to the pit supported portion; and fastening the pit supported portion to the deck supporting portion with a fastener inserted into a hole and a slot.

26 Claims, 13 Drawing Sheets

SHIMLESS FRAME SUPPORT METHOD AND APPARATUS FOR DOCK LEVELERS

FIELD OF THE INVENTION

The present invention relates generally to leveling systems. More particularly, the present invention relates to a system to level a dock leveler.

BACKGROUND OF THE INVENTION

Dock levelers are used in warehouses to provide a bridge between the floor of the warehouse and a motor vehicle such as a semitrailer. In a typical application the vehicle is backed up to a warehouse for loading or unloading. At least two problems exist in providing a bridge between the bed of the truck and the loading dock.

One problem is that the trailer bed may be of a different height than the floor of the loading dock. The second problem is that there is a gap between the end of the trailer bed and the floor of the loading dock. To solve both of these problems, dock levelers are used.

The dock leveler can be raised or lowered to the level of the vehicle bed. A portion of the dock leveler, typically the lip, is inserted in the vehicle and rests the bed of the vehicle to provide a bridge between the bed of the vehicle and the loading dock.

One type of dock leveler, sometimes referred to as a pit leveler, is located in a pit that is sunken below the surface of the floor of the loading dock. When the dock leveler is mounted into a pit, a deck portion of the dock leveler is typically stored at a location that is level with the surrounding loading dock floor. Because of the desirability of having the dock leveler deck stored level with the loading dock floor, installation of the dock leveler into a pit should account for variances often associated with manufacturing tolerances in the dock leveler and/or in the depth of the pit.

Often, when installing dock levelers into pits, a dock leveler frame is placed on the floor of the pit and then the dock leveler frame is shimmed at various places in order to ensure that the deck of the dock leveler is level with the surrounding dock floor when the deck is in a stored position.

Shimming the frame when installing a dock leveler is one way to address the problem of ensuring that the dock leveler deck is level with the surrounding dock floor in view of variances of pit floor depth associated with different pits and manufacturing tolerances of the dock leveler itself. However, installing shims beneath the frame of a dock leveler to level the leveler can time and labor intensive. In addition, it is often imprecise.

For example, when an installer installs a dock leveler, the installer must bring many shims of various thickness to in order to be prepared to attempt to level a dock lever under a wide range of variances in pit depth and dock leveler height.

An additional problem in using shims to level a dock leveler is that shims are of a discrete thickness. As such, there is a limitation as to how level a dock leveler deck can be with the surrounding dock floor. In some situations, a dock leveler deck can be slightly below the level of the surrounding dock floor, however, adding even the thinnest shim, can put the dock leveler deck slightly above the level of the surrounding dock floor. Thus, shims can be limited in how level they can make a dock leveler deck with the surrounding dock floor.

Accordingly, it is desirable to provide a method and apparatus to install a dock leveler into a pit and to provide for a way to level the deck of the dock leveler when the deck is in a stored position to be level with the surrounding warehouse floor in a simple, efficient and more precise manner.

SUMMARY OF THE INVENTION

The foregoing needs are met, to a great extent, by the present invention, wherein in one aspect an apparatus and method is provided that in some embodiments provide a way to level the deck of a dock leveler installed in a pit in a simple, efficient and more precise manner.

In accordance with one embodiment of the present invention, a dock leveler frame is provided. The dock leveler frame includes a pit supported portion; a deck supporting portion configured to provide support to a deck portion of the dock leveler; and a fastener configured to contact corresponding structure on the pit supported portion and deck supporting portion, the corresponding structure configured to allow the pit supported portion and deck supporting portion to be fastened to each other via the fastener at multiple positions with respect to each other.

In accordance with another embodiment of the present invention, a dock leveler frame is provided. The dock leveler frame includes: a pit supported portion; a deck supporting portion configured to provide support to a deck portion of the dock leveler; and means for connecting the pit supported portion and deck supporting portion, the means for connecting configured to allow the pit supported portion and deck supporting portion to be connected to each other at multiple positions with respect to each other.

In accordance with yet another embodiment of the present invention, a method of configuring a dock leveler frame to install a dock leveler in a pit and have a level deck without the use of shims is provided. The method includes: providing a pit supported portion of a dock lever frame; placing a deck supporting portion of the frame in a desired position with respect to the pit supported portion; and fastening the pit supported portion to the deck supporting portion with a fastener inserted in to a hole and a slot.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. In addition, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
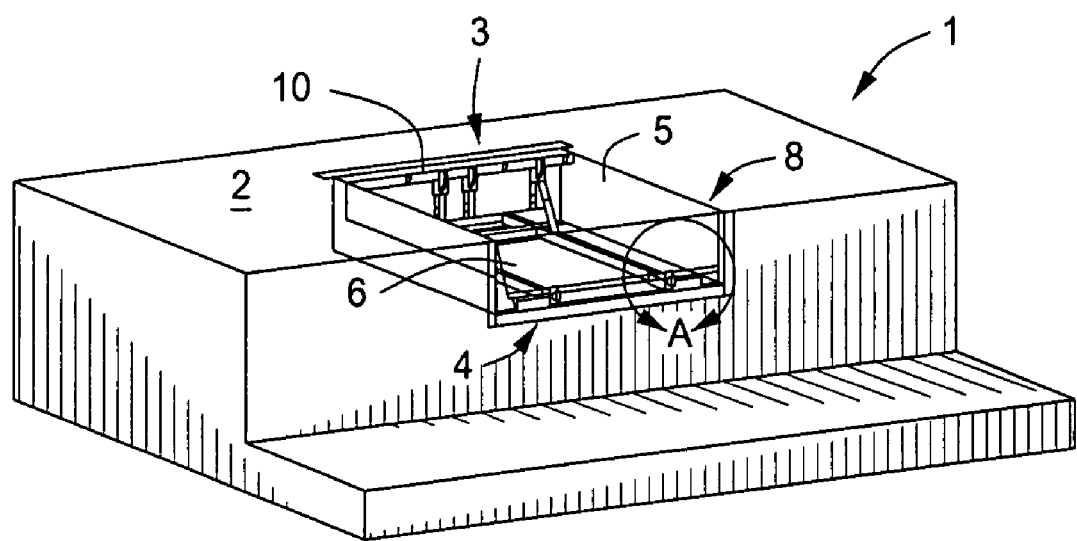
FIG. 1 is a perspective view of a dock leveler installed at a loading dock in accordance with one embodiment of the invention.
Figure 2:
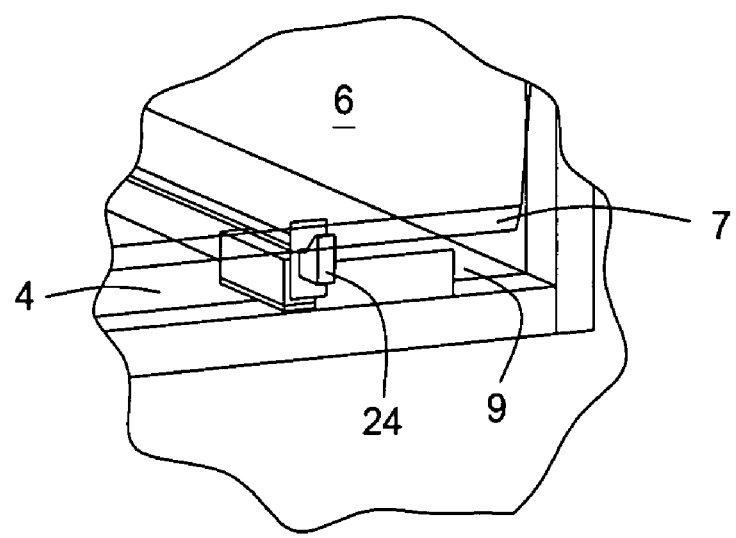
FIG. 2 is an enlarged perspective view of the portion indicated by detail "A" in FIG. 1.

The invention will now be described with reference to the drawing figures, in which like reference numerals refer to like parts throughout. In FIG. 1 a loading dock 1 having a dock floor 2 is shown. A dock leveler 3 is installed in a pit 4 in the floor 2 of the loading dock 1. The dock lever 3 includes a deck 5, a lip 6 and a frame 10. The deck 5 and lip 6 are drawn in a see through manner to show more detail. FIG. 2 is an enlarged drawing of a portion of FIG. 1. FIG. 2 shows the lip 6 (also drawn in a see-through manner) having a lower end 7 resting in a lip keeper 24. FIG. 2 also shows portions of the frame 10 rest on the pit floor 9. In some embodiments of the invention, and as shown in FIGS. 1 and 2, the lip 6, when supported by the lip keeper 24, supports the free end 8 of the deck 5.

Figure 3:
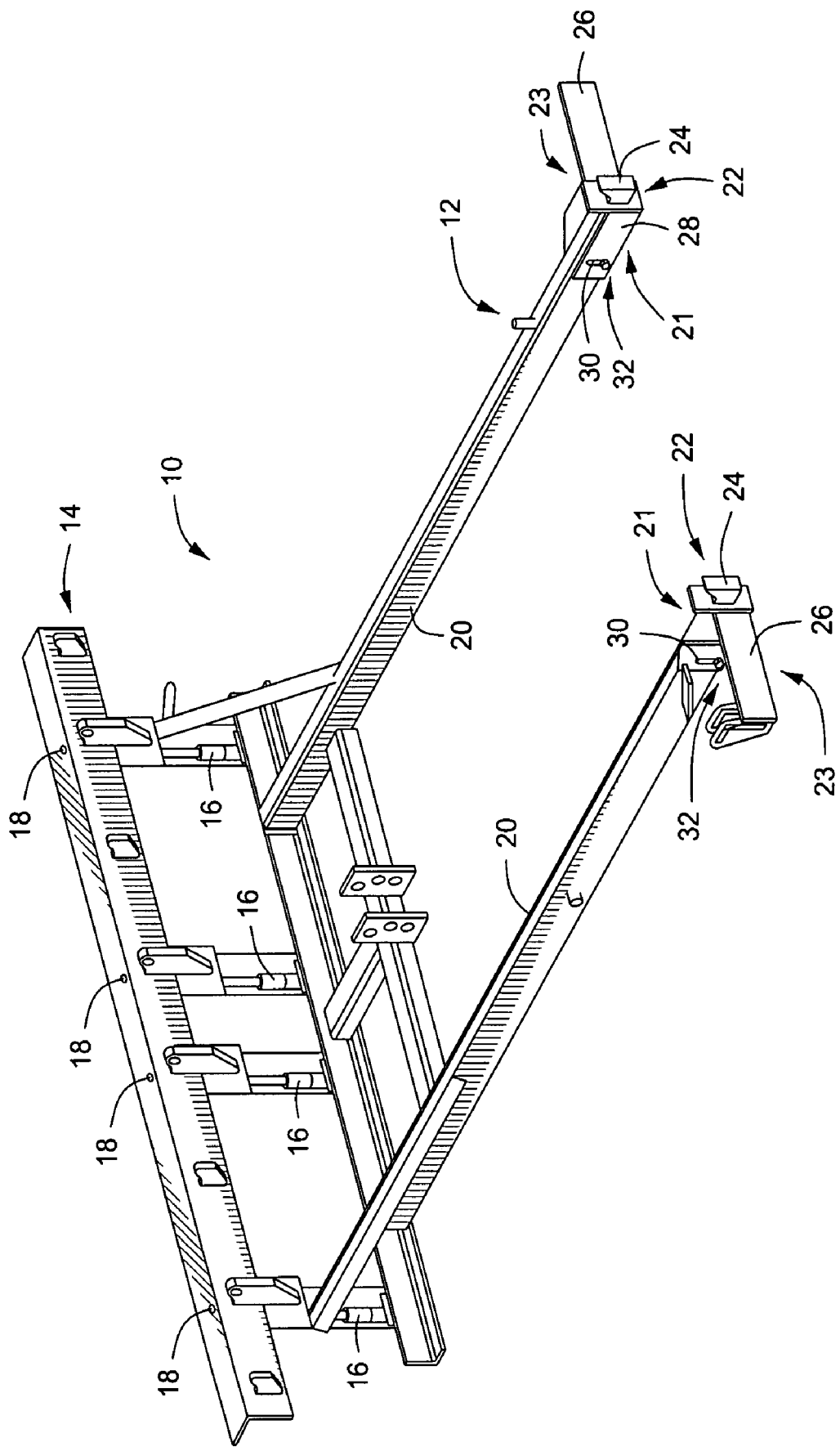
FIG. 3 is a perspective view of a dock leveler frame in accordance with one embodiment of the invention.

Turning now to FIG. 3, a dock leveler 3 frame 10 is shown with the deck 5 and lip 6 removed. The dock leveler frame 10 has a front portion 12 of the frame 10. The front portion 12 of the frame 10 is the portion of the frame 10 located at the end of the dock leveler 3 where a truck or other vehicle will approach to be on or offloaded. A rear portion 14 of the frame 10 is the portion of the frame 10 that the deck 5 is pivotally attached. In the rear portion 14 of the frame 10, a shimless leveling system 16 is illustrated for allowing adjustment and leveling of the rear portion 14 of the frame 10 as shown and described in U.S. patent application Ser. No. 11/347,206, hereby included by reference in its entirety.

The leveling system 16 also includes adjustment heads 18, which provide a way for a tool to attach to the adjustment system 16 and twist the adjustment heads 18 to level the rear portion 14 of the dock leveler frame 10 as described in the aforementioned patent application.

The front portion 12 of the dock leveler frame 10 is attached to the rear portion 14 of the dock leveler frame 10 by longitudinal frame members 20. The longitudinal frame members 20 terminate at their front ends with a dock leveler leveling system 23.

The dock leveler leveling system 23 includes a pit supported portion 21 and a deck supporting portion 22. The pit supported portion 21 is supported by the pit floor 9. In some embodiments, the pit supported portion 21 includes the end of longitudinal frame members 20 and a hole 31 (see FIG. 4 for example) in the longitudinal frame member 20. In other embodiments of the invention, the pit supported portion 21 includes other parts of the frame 10. The deck supporting portion 22 supplies structural support to the free end 8 of the deck 5 (see FIG. 1). In accordance with the invention, the pit supported portion 21 and the deck supporting portion 22 of the frame 10 can move with respect to each other during the installation of the dock leveler 3 before being fixed to each other.

In some embodiments of the invention, the deck supporting portion 22 includes a lip keeper 24. The lip keeper 24 will support the deck 5 of the dock leveler 3 when the lip 6 is in a retracted position and placed in the lip keeper 24. In some embodiments of the invention, the pit supported portion 21 includes a perpendicular member 26. The perpendicular member 26 is attached to the U-shaped shoe 28 and is generally perpendicular to the longitudinal frame members 20. In other embodiments of the invention as shown in FIGS. 14-17, the deck supporting portion 22 supports the deck by supporting support legs mounted to the deck as described in more detail below.

Figure 4:
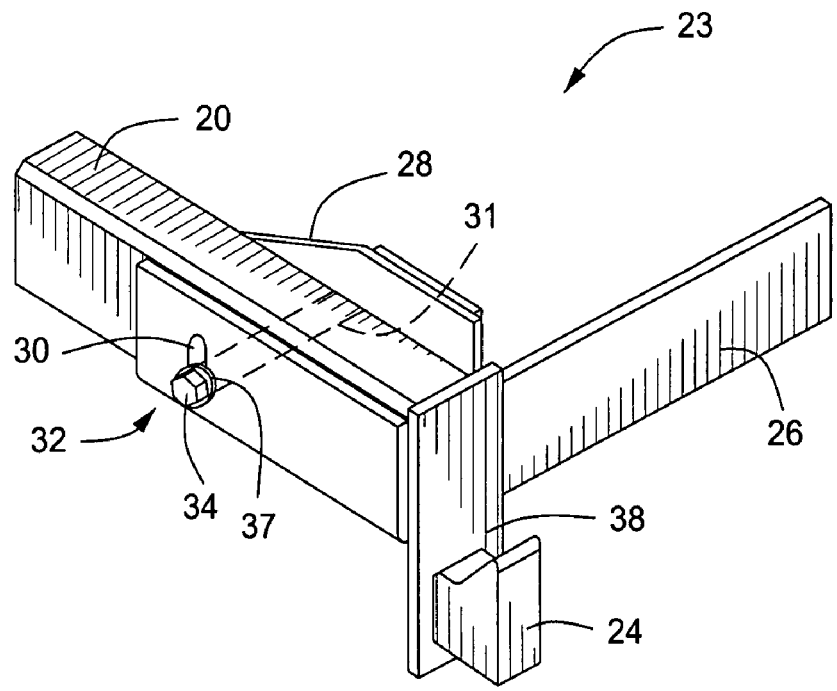
FIG. 4 is a perspective view of a portion of the dock leveler frame in accordance with an embodiment of the invention.

FIG. 4 is a perspective view of a leveling system 23, similar to the leveling system shown in FIG. 3. FIG. 4 is an enlarged view of the leveling system 23. The following description will be relevant to FIGS. 3-6. The deck leveling system 23 also includes a U-shaped shoe 28. The U-shaped shoe 28 is attached to the perpendicular member 26. The U-shaped shoe 28 is configured to receive longitudinal frame member 20 in the hollow portion of the U-shaped shoe 28.

In order to provide adjustment between the relative position of the pit supported portion 21 and the deck supporting portion 22, a slot 30 is provided in the U-shaped shoe 28. A hole 31 is provided in the longitudinal frame member 20 (sometimes referred to as a longitudinal beam 20). The U-shaped shoe 28 and the longitudinal beam 20 are aligned so that a fastener such as a bolt 34 is placed in the slot 30 in the U-shaped shoe 28 and hole 31 of the longitudinal beam 20 as shown in FIGS. 3-6.

The hole 31 in the beam 20 is dimensioned to not provide much room for the bolt 34 to move radially within it. However, the slot 30 does provide allowance for relative movement between the bolt 34 and slot 30.

The fastener system 32 includes a bolt 34, a nut 36 (see FIG. 6) and one or more washers 37. Once the pit supported portion 21 and the deck supporting position 22 are in a desired location relative to one another, the fastener system 32 is tightened to avoid movement between the pit supported portion 21 and the deck supporting position 22. Once the fastener system 32 has tightened, the two frame portions 21 and 22 can be fixed relative to each other using any suitable method. In some embodiments welding the pit supported portion 21 to the supporting portion 22 is done to fix the two portions to each other.

In the embodiments shown in FIGS. 1-6, the longitudinal frame member 20 can optionally be welded to the U-shaped shoe 28. The welding is done in embodiments where it is anticipated that during the operation of the dock leveler more stress will be placed on the connection between the pit supported portion 21 and the deck supporting portion 22 then can be resisted by the fastener system 32. Thus, in some embodiments, the fastener system 32 provides a method for fastening the pit supported portion 21 to the deck supporting portion 22 long enough (such as during installation of the dock leveler) for a more sure method of attaching the pit supported portion 21 to the deck supporting portion 22 together.

In some embodiments of the invention, as shown in FIG. 4, the lip keeper 24 is positioned at a different place than the substantially centered position as identified in FIG. 3. For example, FIG. 4 illustrates a lip keeper 24 attached to a lip keeper plate 38 at a position below the longitudinal frame members 20. In some embodiments of the invention, the lip keeper 24 and the lip keeper plate 28 will be located outside of the pit and thus able to extend to positions below the pit floor 9. It is anticipated that one skilled in the art, after reviewing this disclosure, will be able to select a lip keeper plate 28 and a lip keeper 24 dimensioned to provide the lip keeper 24 at a desired location.

Figure 5:
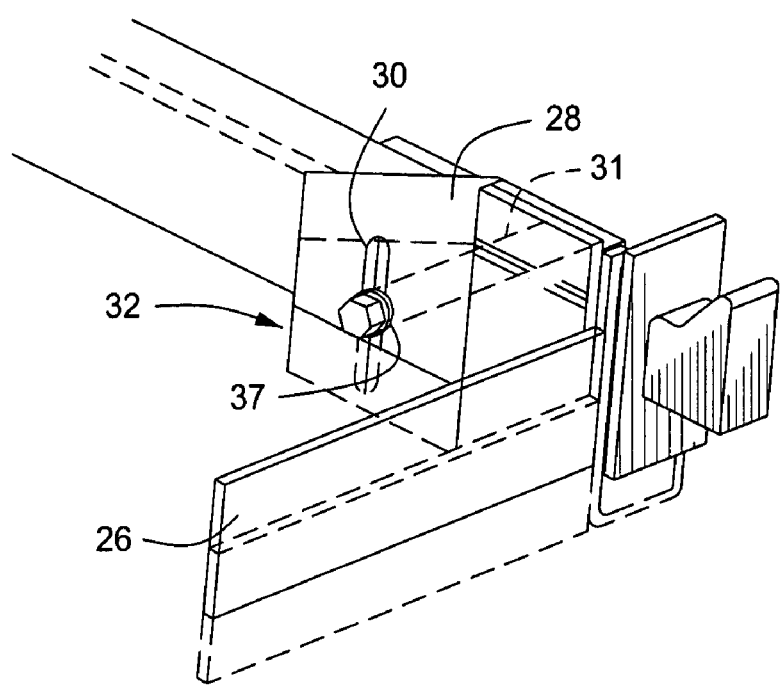
FIG. 5 is a perspective view of a portion of the dock leveler frame illustrating a range of motion that a portion of the frame can achieve with respect to a longitudinal frame member.
Figure 6:
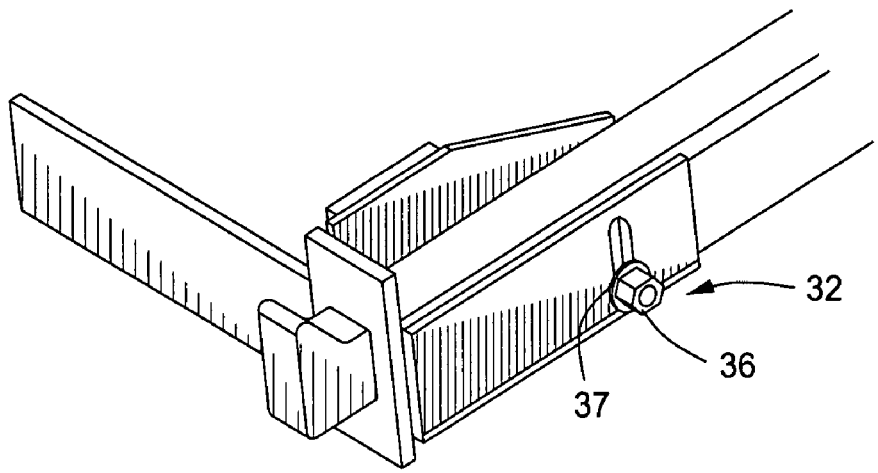
FIG. 6 is a perspective view of a portion of a dock leveler frame in accordance with an embodiment of the invention.

FIG. 5 illustrates the extreme positions that the deck supporting portion 22 can be with respect to the pit supported portion 21. As shown in dashed lines, the U-shaped shoe 28 and the perpendicular member 26 are in extreme low positions where the fastener 32 is located at a top portion of the slot 30. As shown in solid lines, the U-shaped system shoe 28 and the perpendicular member 26 are shown in extreme upper position where the fastener system 32 is shown in a bottom portion of the slot 30. The drawing of FIG. 5 shows the two extreme relative positions of the U-shaped shoe 28 and the longitudinal frame member 20. In some embodiments of the invention, and as shown in FIG. 5, once the dock leveler is installed, the U-shaped shoe 28 rests on the pit floor 9.

In some embodiments of the invention, the dock leveler 3 is installed in the following way. The dock leveler 3 is lifted by a crane, hoist, or other suitable apparatus to a position in the pit 4 where the deck 5 is level with the surrounding dock floor 2 and the lip 6 is supported by the lip keepers 24. In some embodiments of the invention, the dock leveler 3 may be equipped with contact points to provide attachment points to facilitate the dock leveler 3 being suspended by a crane or hoist.

Initially the U-shaped shoe 28 and perpendicular member 26 are in a raised position (as shown in solid lines in FIG. 5). When the deck 5 is level with the surrounding dock floor 2, the fastening system 32 is loosened and allows the U-shaped shoe 28 and perpendicular member 26 to drop or be moved to a lowered position and contact the pit floor 9. Once the U-shaped shoe 28 and perpendicular member 26 are in contact with the pit floor 9, the fastening system 32 is tightened. The dock leveler 3 is released from the crane or hoist and the dock leveler 3 remains in position, with some of its weight being supported by the U-shaped shoe 28 and the perpendicular member 26. In many embodiments, the U-shaped shoe 28 is welded to the longitudinal member 20 once a desired relative position between the U-shaped shoe 28 and the longitudinal member 20 has been identified as mentioned above. As shown in FIG. 2, in some embodiments of the invention, the longitudinal frame member 20 does not necessarily contact the pit floor 9 when the dock leveler 3 is installed into the pit 4.

Other methods of installing the dock leveler 3 can also be employed. For example, the dock leveler 3 can be placed into the pit 4. The fastener system 32 may be loosened, and the deck 5 may be raised using any suitable means (for example, using manual means such as levers or using mechanical means) to a position level with the surrounding dock floor 2. The deck supporting portion 22 is moved with respect to the pit supported portion 21 to where the deck supporting portion 22 supports the deck 5 in a position level with the surrounding dock floor 2. The fastening system 32 is then tightened to keep the pit supported portion 21 and the deck supporting portion 22 from moving relative to each other. The pit supported portion 21 and deck supporting portion 22 may then be welded or otherwise fixed to each other.

In short, there are at least two primary ways of installing a dock leveler in accordance with the invention. Either starting with a deck 5 level with the surrounding dock floor 2 and adjusting the pit supported portion 21 to rest on the dock floor, or start with the pit supported portion 21 resting on the pit floor 9 and adjusting the deck 5 and deck supporting portion 22 to move cause the deck 5 to be level with the surrounding dock floor 2.

FIGS. 7-13 show alternative embodiments of the invention having a lip keeper 24 integrated with a lip keeper frame 42. The lip keeper frame 24 includes slots 30.

Figure 13:
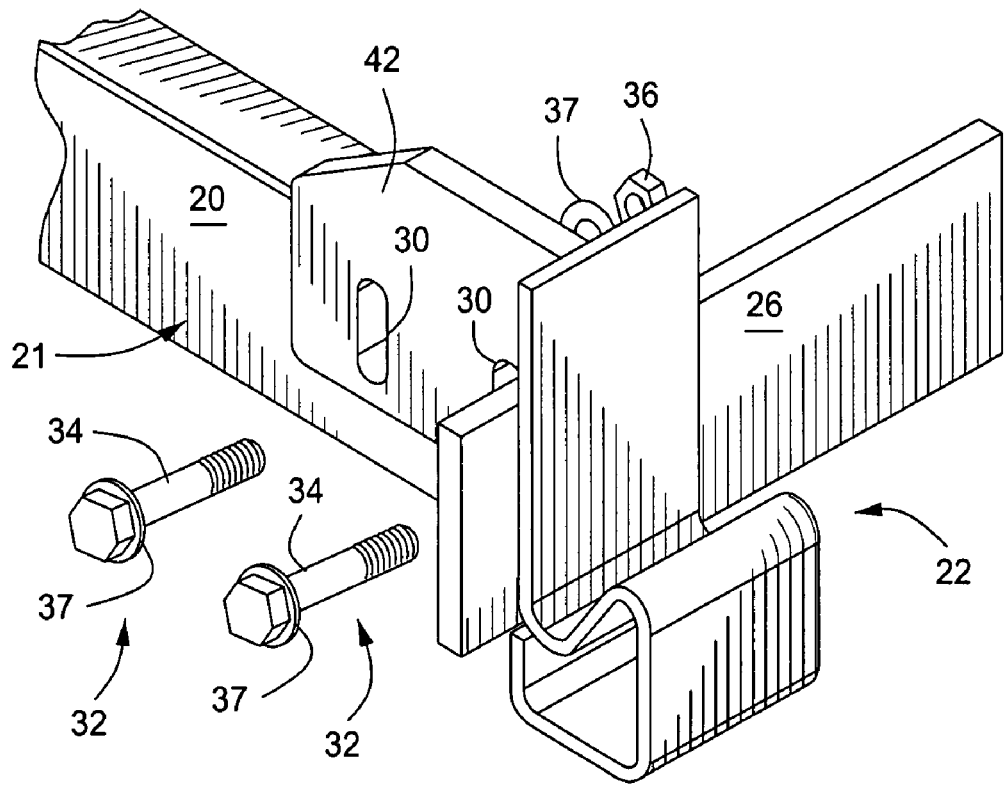
FIG. 13 is a perspective view of a portion of a dock leveler frame including the deck supporting portion of FIGS. 7-8.
Figure 7:
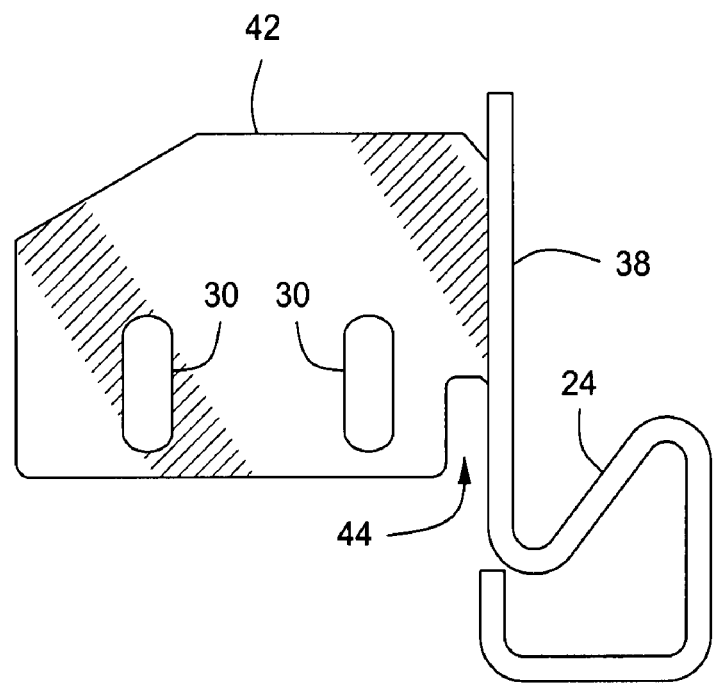
FIG. 7 is a side view of a deck supporting portion of a dock leveler frame in accordance with another embodiment of the invention.
Figure 8:
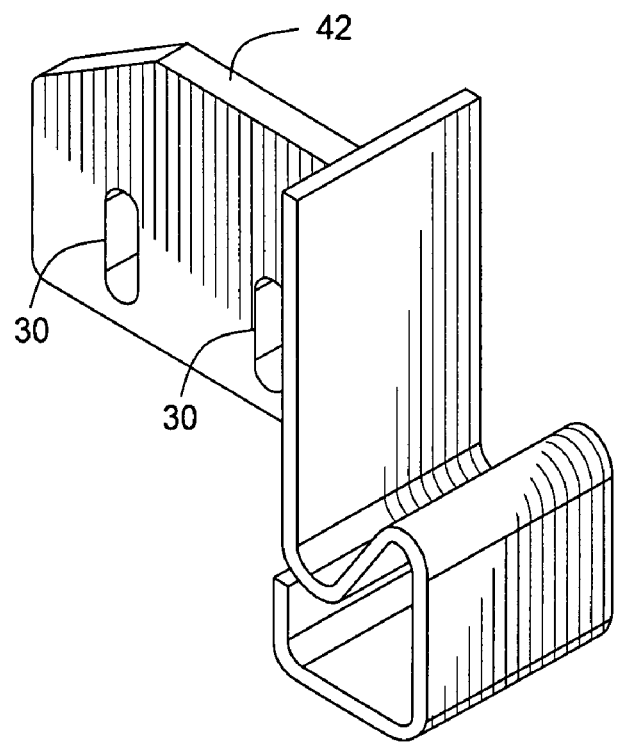
FIG. 8 is a perspective view of the deck supporting portion shown in FIG. 7.
Figure 9:
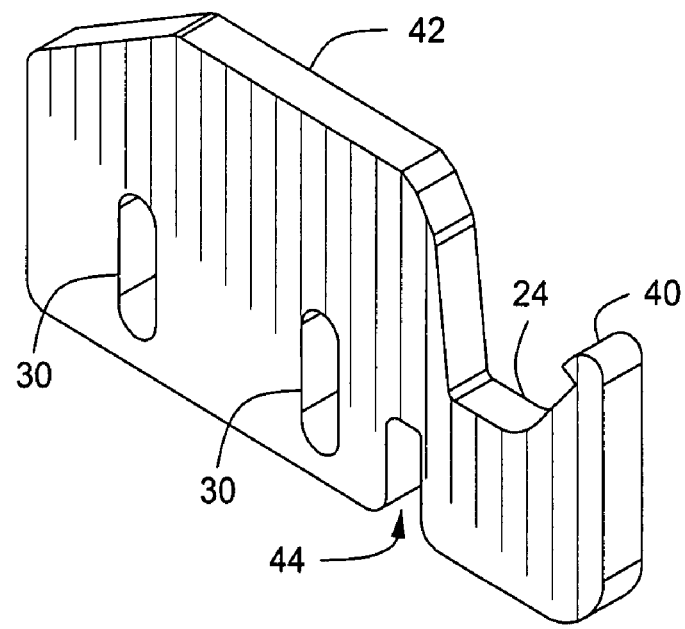
FIG. 9 is a perspective view of a deck supporting portion of a dock leveler frame in accordance with another embodiment of the invention.
Figure 10:
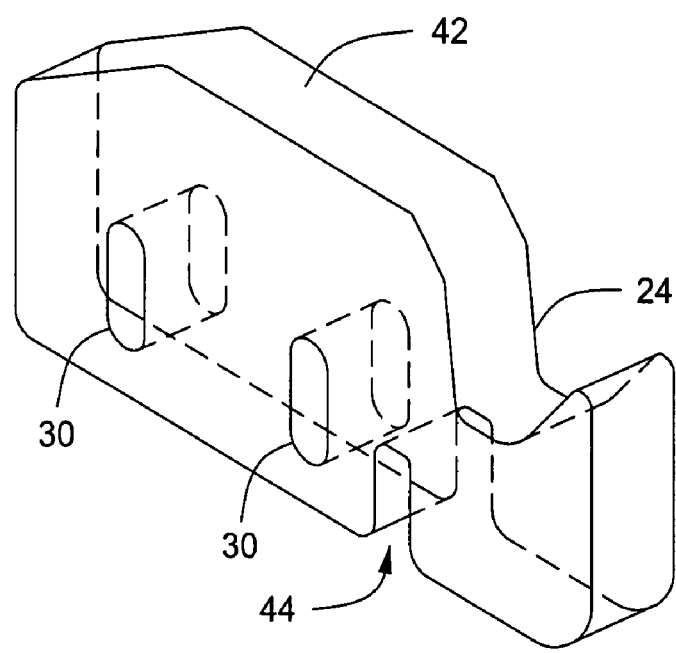
FIG. 10 is a perspective view of a deck supporting portion in accordance with another embodiment of the invention.
Figure 11:
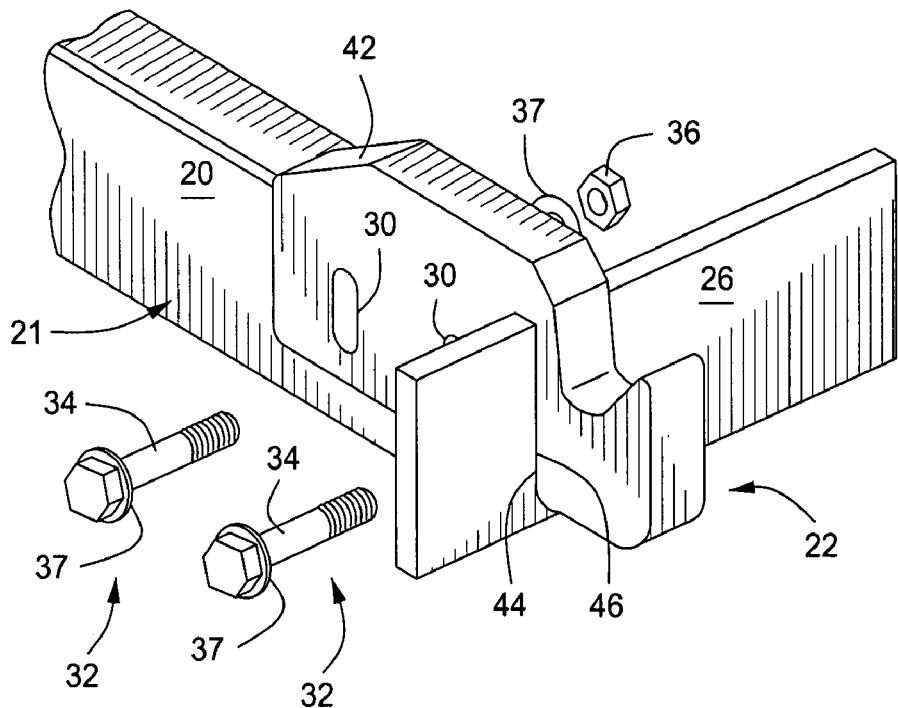
FIG. 11 is a perspective view of a portion of a dock leveler frame including the deck supporting portion of FIG. 10.
Figure 12:
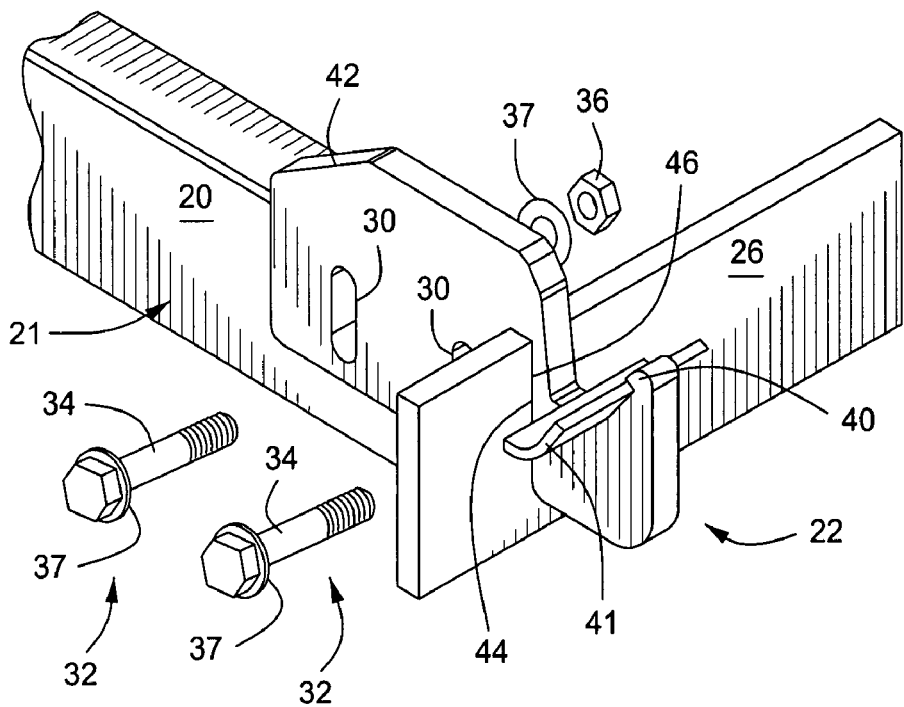
FIG. 12 is a perspective view of a portion of a dock leveler frame including the deck supporting portion of FIG. 9.

In some embodiments of the invention, the lip keeper frame 42 further includes a notch 44 that fits into a corresponding notch 46 in a perpendicular member 26 as shown in FIGS. 11-13. In FIGS. 7-13, the lip keeper 24 may be of various geometry, which in some embodiments as shown in FIG. 9, may include a hook 40. The hook 40 helps to hold a plate 41 welded to the hook 40 as shown in FIG. 12.

One feature of the embodiments shown in FIG. 7-13 is that by having two slots 30 with two fastening systems 32, the lip keeper frame 42 can be skewed right and left for providing a desirable orientation by moving the fastening systems 32 in slightly different positions in the slots 30 as explained in more reference to FIGS. 11-13.

FIGS. 11-13 illustrate another embodiment of the invention where the deck supporting portion 22 includes a lip keeper frame 42 similar to those shown in FIGS. 7-10. The lip keeper frame 42 has a slot 44, which is inserted to a corresponding lip keeper receiving slot 46 located on the perpendicular member 26. The pit supported portion 21 includes a longitudinal frame member 20. The lip keeper frame 42 connects to the longitudinal frame member 20 with two fastener systems 32. The fastener systems 32 include a bolt 34, a nut 36 and one or more washers 37. The bolts 34 are inserted through the slots 30 in the lip keeper frame 42 and holes 31 (See FIGS. 4 and 5) located in the longitudinal frame members 20.

The pit supported portion 21 and the lip keeper frame 42 are adjusted relative to each other along the slots 30 until they achieve a desired position with respect to each other. Then the bolts 34 and the nuts 36 are tightened in order to hold the lip keeper frame 42 snug to the longitudinal frame member 20 until the lip keeper frame 42 can be welded or otherwise fixed to the longitudinal frame member 20.

In some cases, the pit floor 9 may be slanted from back to front. The deck 5 of the dock leveler 3 (see FIG. 1) can be kept level with respect to the dock floor 2 by compensating for the slope of the pit floor 9. The slope of the pit floor 9 can be compensated for by adjusting the attitude of the lip keeper frame 42. The pit supported portion 21 can be adjusted by being twisted with respect to the lip keeper frame 42 to cause the pit supported portion 21 to point slightly up or down before tightening the fastener system 32.

In instances where the dock floor 9 is sloped from right to left or vise versa, this slope may be compensated for by having the one pit supported portion 21 to be adjusted higher or lower that the opposite pit supported portion 21 mounted to the same frame 10. In this manner the deck 5 may be made level with the surrounding dock floor 2.

As shown in FIGS. 11-13, the lip keeper frame 42 is fastened to the longitudinal members 20. As described with respect to other embodiments, the bolts 34 are inserted through the slots 30 in the lip keeper frame 42 through holes 31 in the longitudinal frame members 20 allowing the lip keeper frame 42 to be attached to the longitudinal frame member 20.

FIGS. 14-17 illustrate another embodiment of the invention. In the embodiments shown FIGS. 14-17, the pit supported portion 21 and the deck supporting portion 22 are moved relative to each other until the pit supported portion 21 contacts the pit floor 9 and the deck 5 is level with the surrounding dock floor 2 (see FIG. 1). Once in place, the pit supported portion 21 supports the deck supporting portion 22.

Figure 14:
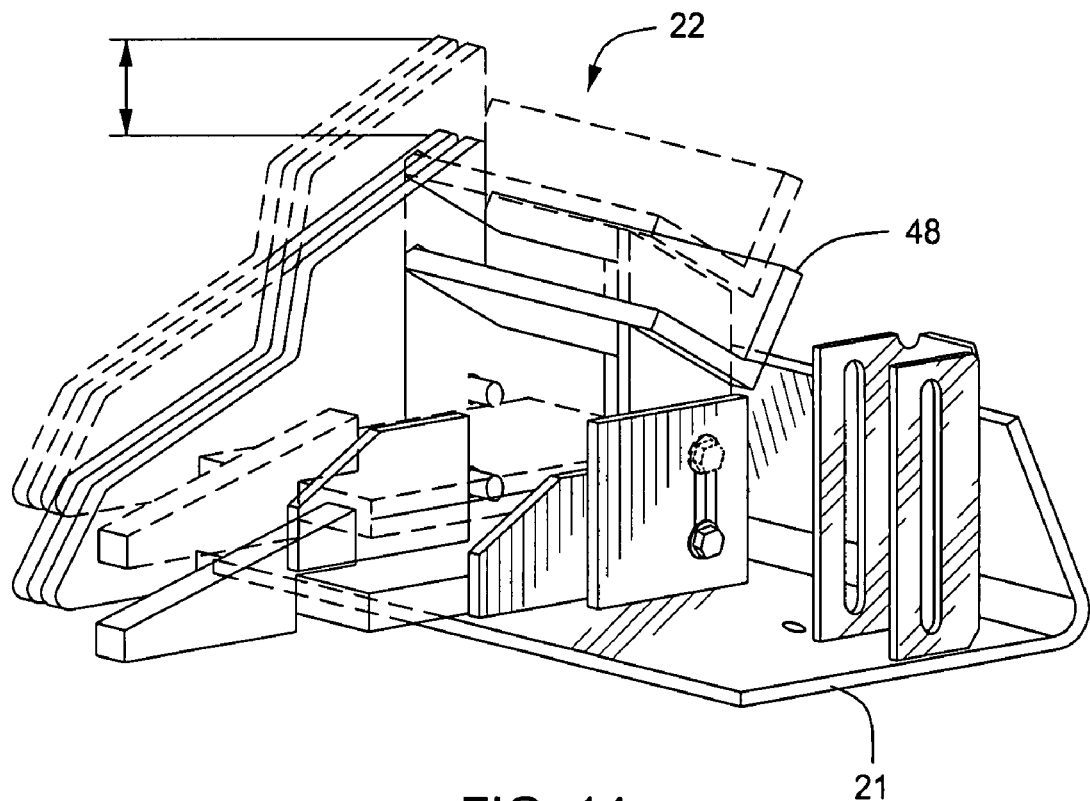
FIG. 14 is an illustration of a deck supporting portion and a pit supported portion of a dock leveler frame. The deck supporting portion is illustrated at extreme high and extreme low positions with respect to the base portion in accordance with another embodiment of the invention.
Figure 15:
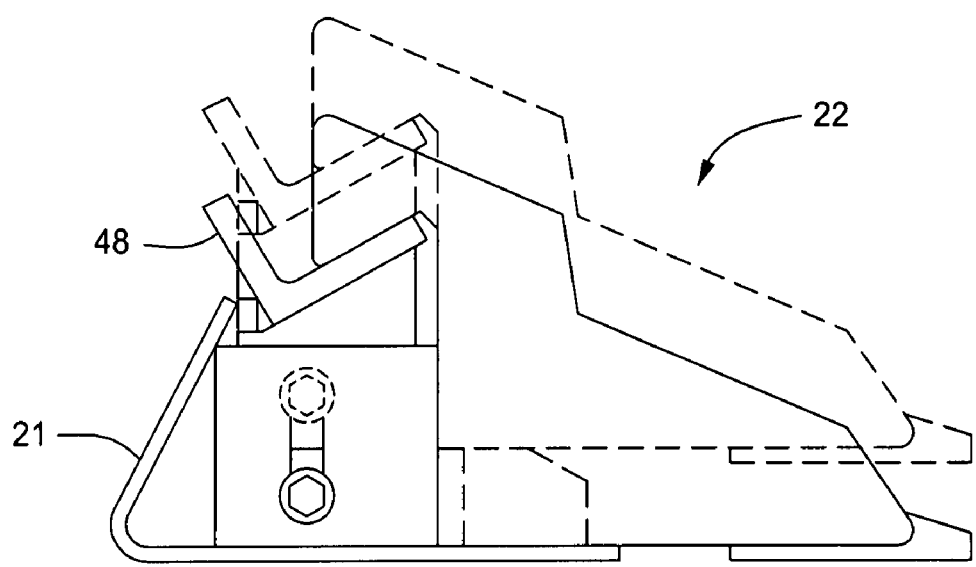
FIG. 15 is a side view of the portion of the dock leveler frame illustrated in FIG. 14 and illustrates an extreme high and extreme low position of the deck supporting portion with respect to the base portion of the dock leveler frame.

FIGS. 14 and 15 illustrate an extreme high and low position that the deck supporting portion 22 can achieve with respect to the pit supported portion 21. In FIGS. 14 and 15, relative positions of the deck supporting portion 22 with respect to the pit supported portion 21 are shown. The deck supporting portion 22 is shown in the extreme low position with solid lines and in an extreme high position with broken lines.

In some embodiments of the invention using the apparatus as shown in FIGS. 14-17, the dock leveler 3 (see FIG. 1) is installed into a pit 4 as follows. The dock leveler 3 is suspended from a hoist, crane or other suitable apparatus and positioned so the deck 5 is level with the surrounding dock floor 2. The bolts 34 are loosened and the pit supported portion 21 is lowered to the pit floor 9. The fastening system 32 is then tightened and the deck supporting portion 22 and the pit supported portion 21 are wielded together.

Other methods of installing the dock leveler 3 can also be employed. For example, the dock leveler 3 can be placed into the pit 4. The fastener system 32 may be loosened, and the deck 5 may be raised using any suitable means (for example, using manual means such as levers or using mechanical means) to a position level with the surrounding dock floor 2. The deck supporting portion 22 is moved with respect to the pit supported portion 21 to where the deck supporting portion 22 supports the deck 5 in a position level with the surrounding dock floor 2. The fastening system 32 is then tightened to keep the pit supported portion 21 and the deck supporting portion 22 from moving relative to each other. The pit supported portion 21 and deck supporting portion 22 may then be welded or otherwise fixed to each other.

Figure 16:
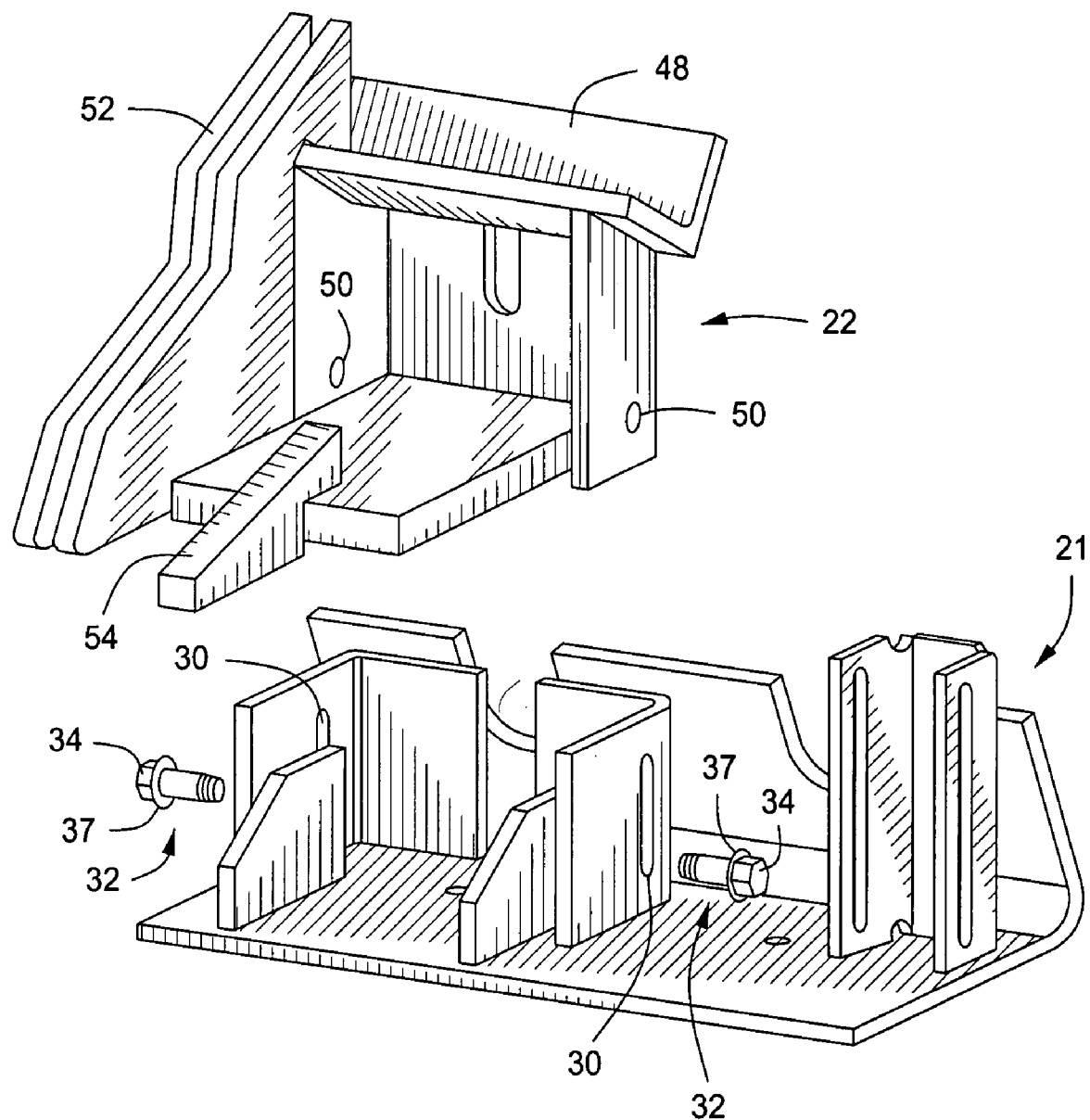
FIG. 16 is an exploded view of the portion of the dock leveler frame illustrated in FIGS. 14, 15 and 17.

FIG. 16 is an exploded view of the pit supported portion 21, the deck supporting portion 22 and the fastener system 32. Similar to the embodiments already described, the fastener system 32 includes a bolt 34 with washers 37. The bolt 34 is inserted into the slots 30 and also into the fastener holes 50 located in the deck supporting portion 22. In some embodiments of the invention, the fastener holes 50 are threaded to allow the bolts 34 to attach to the deck supporting portion 22. In other embodiments of the invention, the bolts 34 pass through the holes 50 and nuts attach to the bolts 34.

The pit supported portion 21 can be moved as dictated by the geometry of the slots 30 until the pit supported portion 21 achieves a desired position with respect to the deck supporting portion 22. In most embodiments a desired position is when the pit supported portion 21 is resting on the pit floor 9 and the deck 5 is level with the surrounding dock floor 2. Then the fastener system 32 is tightened and the pit supported portion 21 and the deck supporting portion are fixed to each other.

Figure 17:
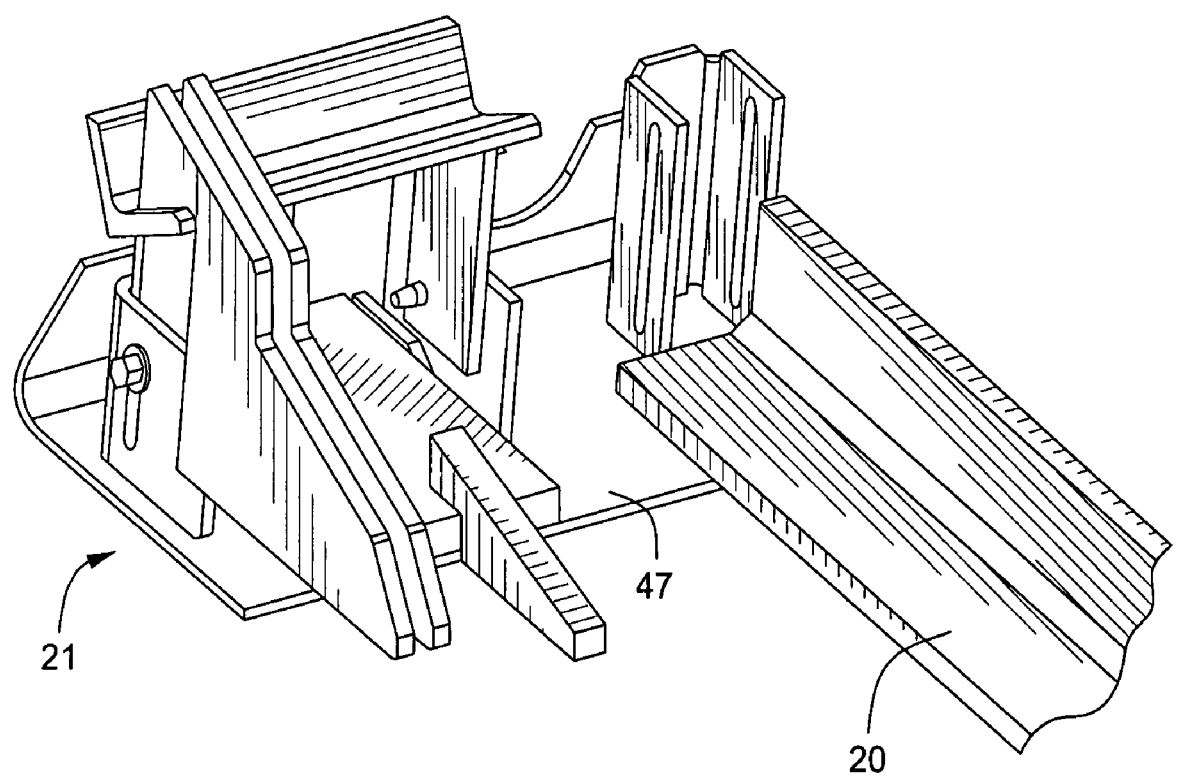
FIG. 17 is an assembled perspective view of the portion of the dock leveler frame illustrated in FIGS. 14-16.

In the embodiment shown in FIGS. 14-17, the pit supported portion 21 sits on the pit floor 9 and may be attached to longitudinal frame members 20 in any suitable manner. In FIG. 17 an angle 20 is the longitudinal frame member 20 is shown welded to a support plate 47 of the deck pit supported portion 21.

In the embodiment shown in FIGS. 14-17 the deck supporting portion 22 includes a support saddle 48. The support saddle 48 is configured to support legs attached to the bottom of a dock leveler deck. For example, U.S. Pat. No. 6,931,686, which is hereby incorporated by reference in its entirety, describes a support leg system using a support leg support system 48 similar to that shown in FIGS. 14-15.

The support leg may be retracted via a camming surface 52, which in some embodiments of the invention, is part of the deck supporting portion 22. A support leg ramp 54 may also be included as part of deck supporting portion 22 which aids in allowing a support leg to be retracted when the dock leveler deck 5 is in a below dock position as described in the aforementioned U.S. Pat. No. 6,931,686.

FIG. 17 illustrates the pit supported portion 21 and the deck supporting portion 22 in an exemplary final position where the fastener system 32 is tightened and the pit supported portion 21 has been welded to the deck supporting portion 22.

In some embodiments of the invention, a dock leveler will have two (or in some embodiments more) sets of deck supporting portions 22 of the frame 10 and pit supported portions 21 of the frame 10 as illustrated in FIG. 3. One deck supporting portion 22 and one pit supported portion 21 is located on each side of the frame 10. In some embodiments of the invention, each longitudinal frame member 20 will be terminated with a corresponding pit supported portion 21 and deck supporting portion 22 with the frame 10.

In embodiments in accordance with the invention, having a support leg retracting system, each of the deck supporting portions 22 may include the camming surface 52 and support leg ramp 54 as shown in FIGS. 14-17. Although an example of the leveling system is shown using a dock leveler, it will be appreciated that other items can be leveled using the described system.

Figure 18:
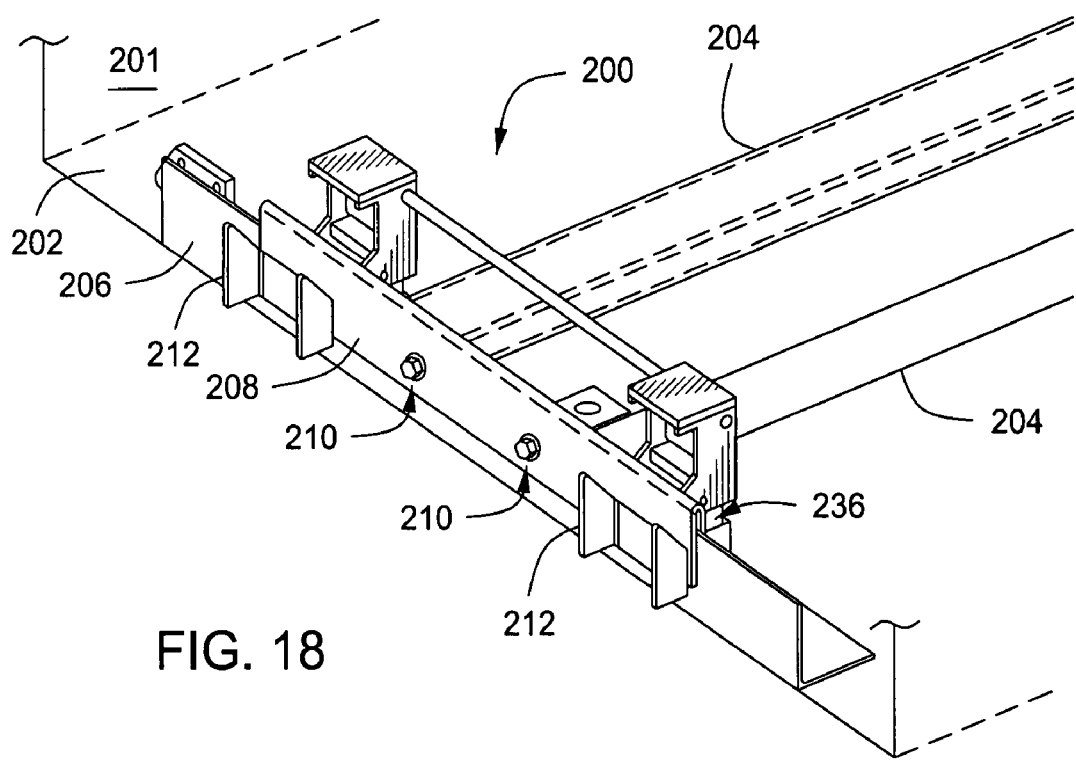
FIG. 18 is a perspective view of a portion of a dock leveler frame in accordance with another embodiment of the invention.

FIGS. 18-23 illustrate yet another embodiment of the invention. As shown in FIG. 18, a dock leveler frame 200 is located in a pit 201 having a floor, 202. The frame 200 includes longitudinal beams 204 which connect to a rear portion of the dock leveler frame 200 and a pivoting deck assembly (not shown in FIG. 18).

The longitudinal beams 204 connect to a cross angle 206. The cross angle 206 can be considered to be a pit supported portion or at least part of a pit supported portion of the dock leveler frame 200. In some embodiments of the invention, the cross angle 206 is secured to the pit floor 202.

Figure 22:
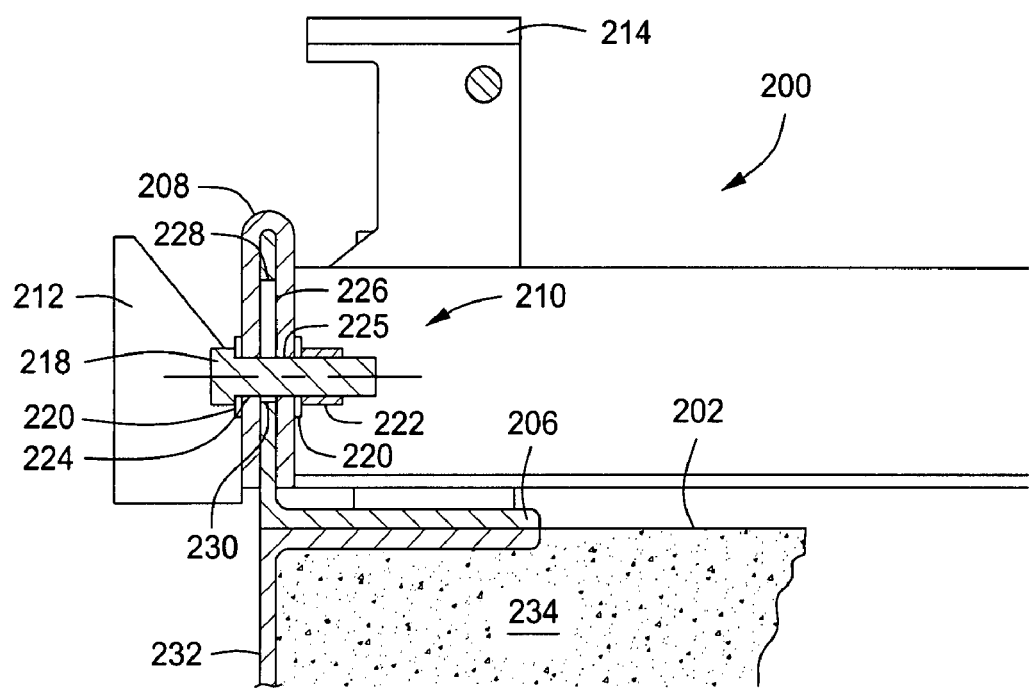
FIG. 22 is a cross section side view of a deck supporting portion of a dock leveler frame attached to a pit supported portion of a dock leveler frame where the deck supporting portion is at a lowered position with respect to the pit supported portion.

As shown in FIG. 22, an embedded angle 232 may be embedded into the concrete 234 at one end of the pit floor 202. The embedded angle 232, may be sunk into the concrete 234 sufficiently so that the angle 232 and the pit floor 202 are substantially a contiguous surface as shown in FIG. 22. In some embodiments of the invention, the cross angle 206 is fixed to the embedded angle 232. The fixing of the cross angle 206 to the embedded angle 232 can be done by welding, bolting or any other suitable way.

A doubler 208 is adjustably attached to the cross angle 206 with a fastener system 210. The doubler 208 may be made of folded steel as shown in FIGS. 18-22, be comprised of several parts, or be made in any suitable matter. The doubler 208 supports, and is connected to, lip keepers 212. The lip keepers 212 support the lip which in turn supports the free end of the dock leveler deck when the lip is in a pendant position and engaged with the lip keepers 212. The doubler 208 can be considered the deck supporting, or at least part of the deck supporting portion, of the dock leveler frame 200.

Figure 19:
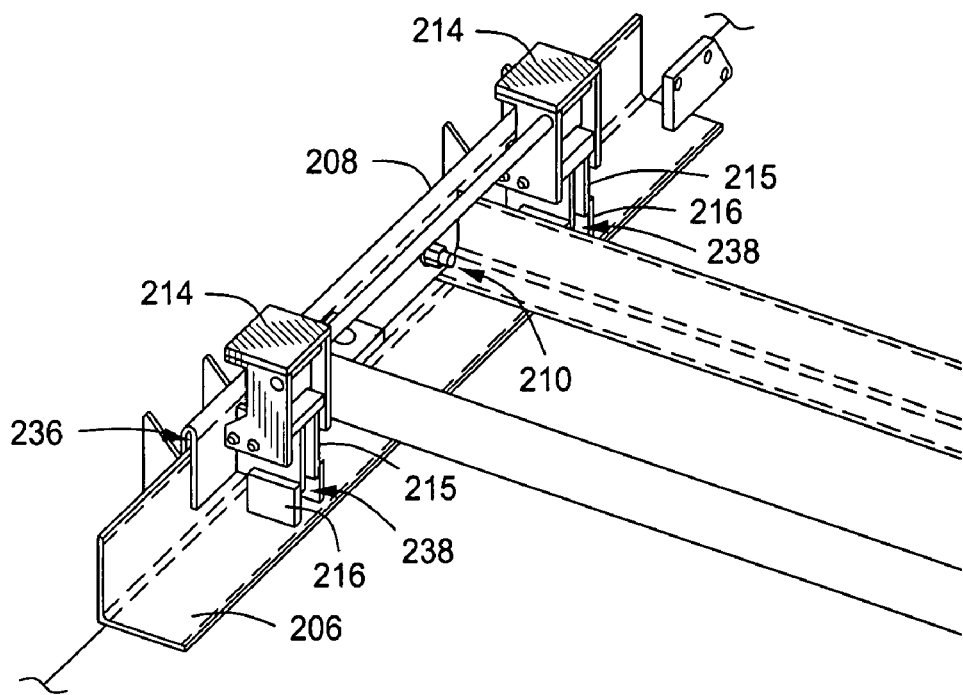
FIG. 19 is a perspective rear view of the dock leveler frame shown in FIG. 18.

FIG. 19 shows the back side of the view shown in FIG. 18. As shown in FIG. 19, stop blocks 214 are mounted to the cross angle 206. The stop blocks 214 are used to support the deck of the dock leveler under certain conditions. The stop blocks 214 are supported by stop block legs 215. The stop block legs 215 are fastened to the doubler 208. The stop block legs 215 may be fastened to the doubler 208 by welding, bolts, or any suitable means of fastening.

Support blocks 216 are mounted to the cross angle 206. The support blocks 216 provide support to the stop block legs 215 by providing a surface for the stop block legs to 215 to be secured to. For example, the stop block legs 215 may be wielded, bolted or otherwise secured (by any suitable means) to the support blocks 216.

When a dock leveler in accordance with the invention and as shown in FIGS. 18-23 is installed, the cross angle 206 is installed and may be secured to the embedded angle 232 (see FIG. 22). The doubler 208 is fit over the cross angle 206 as shown in FIGS. 18-23. The cross angle 206 and doubler 208 are moved with respect to each other until the cross angle 206 contacts the pit floor 202 or embedded angle 232 and the lip keepers 212 will support the lip when stored in the lip keepers 212 at a height to cause the deck to be level with the surrounding dock floor.

In many embodiments of the invention, a desired position is one where: when the deck is in a stored position (a position where the front of the deck is supported, at least in part, by the deck supporting portion of the dock leveler frame 200), the deck is level with the surrounding dock floor. If need be, the cross angle 206 can be canted to make either the right or left side higher than the other side in order to make the cross angle 206 lay flat on the dock floor 202 or embedded angle 323.

Figure 20:
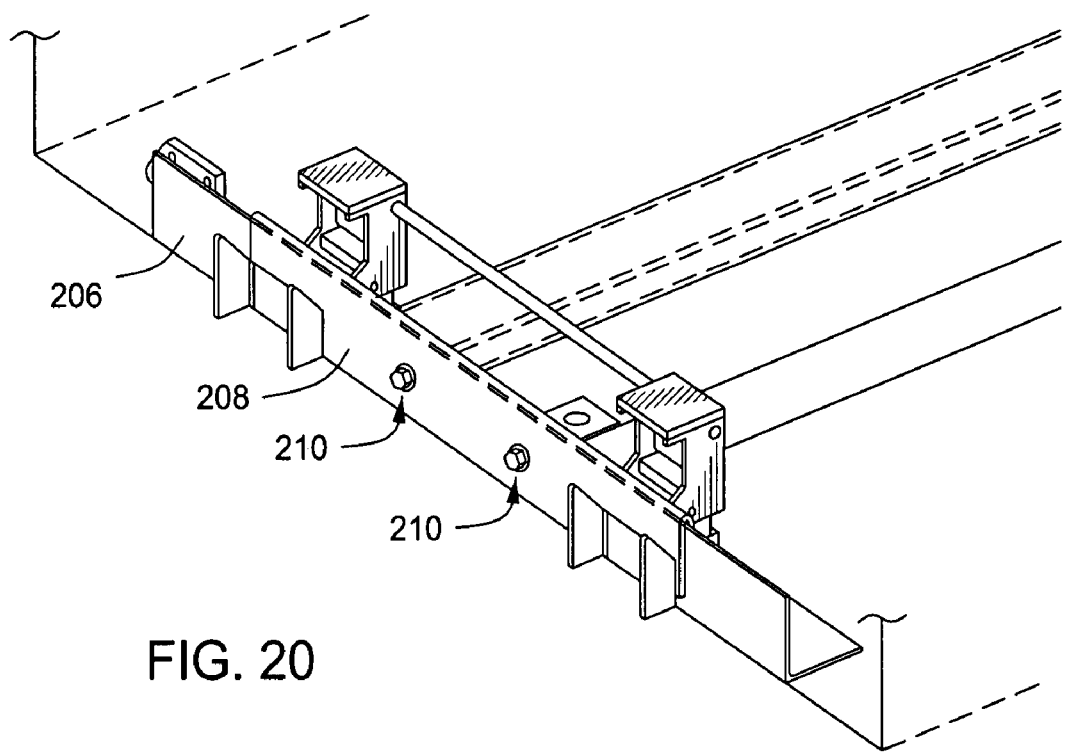
FIG. 20 is a perspective view of the portion of the dock leveler frame shown in FIG. 18 with the deck supporting portion at an extreme low with respect to the pit supported portion of the frame.
Figure 21:
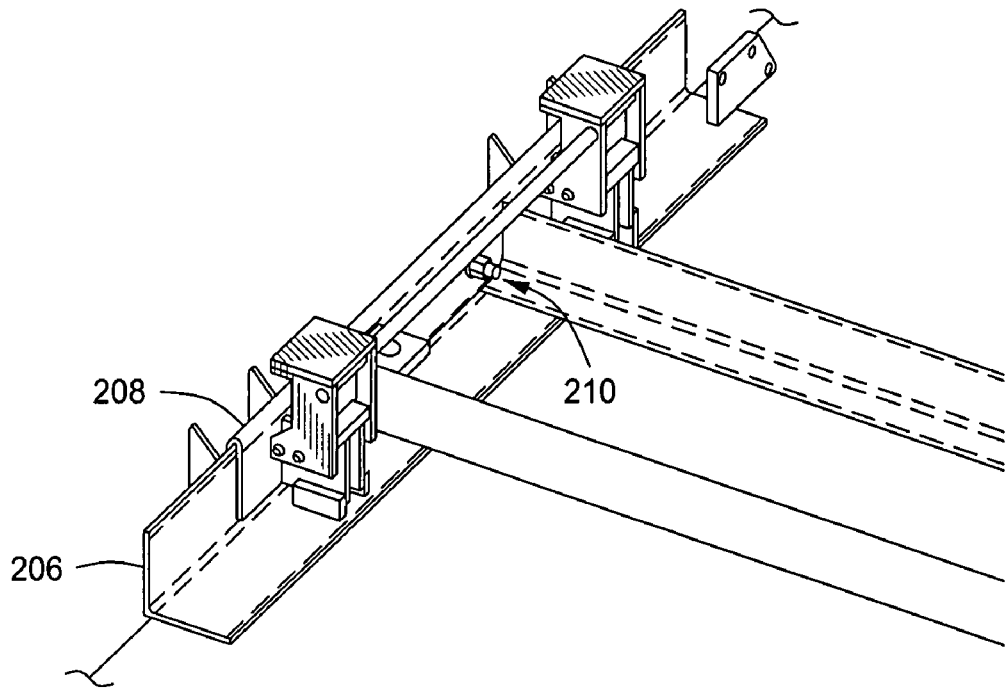
FIG. 21 is a perspective view of the portion of the dock leveler frame shown in FIG. 19 with the deck supporting portion at an extreme low with respect to the connection portion of the frame.

Once the cross angle 206 is in a desired position, the doubler 208 is secured to the cross angle 206 by the fastening system 210. FIGS. 18 and 19 show the doubler 208 in a raised position with respect to the cross angle 206. FIGS. 20 and 21 show the doubler 208 in an extreme low position with respect to the cross angle 206. Once the doubler 208 is fastened to the cross angle 206 by the fastening system 210, the doubler 208 may be welded to the cross angle 206.

Figure 23:
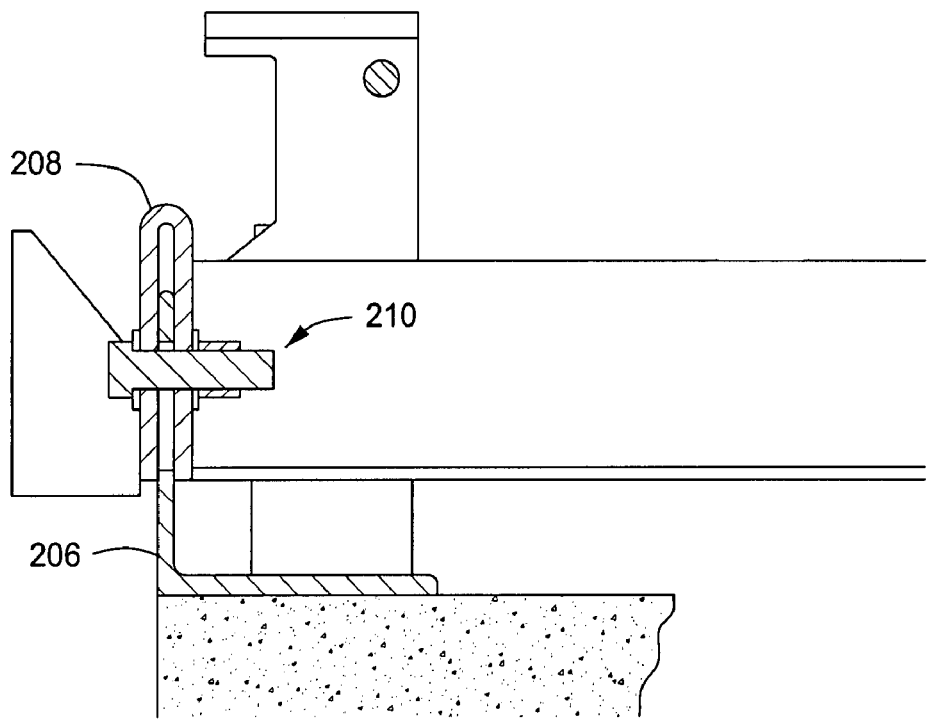
FIG. 23 is a cross section side view of a deck supporting portion of a dock leveler frame attached to a pit supported portion of a dock leveler frame where the deck supporting portion is at a raised position with respect to the pit supported portion.

FIGS. 22 and 23 are cross sections of dock leveler frames 200 in accordance with the invention. The view shown in FIG. 22 shows the doubler 208 in a lowered position with respect to the cross angle 206 similar to as shown in FIGS. 16 and 17. In FIG. 23, the doubler 208 is shown in a raised position with respect to the cross angle 206 similar to as shown in FIGS. 18 and 19.

Similar to the other embodiments described above, the embodiment shown in FIGS. 18-23 uses a hole and slot system to permit one portion of the frame to be adjusted with respect to another portion of the frame. In FIGS. 22 and 23 the holes 224 and 225 in the doubler 208 and the slot 226 in the cross angle 206 are seen. As shown in FIG. 22 a fastener system 210 which in some embodiments may include a bolt 218, washers 220, and a nut 222 is used to fasten the doubler 208 to the cross angle 206. The bolt 218 is located in the holes 224 and 225 and slot 226. The washer 220 and nut 222 are located on the bolt 218 adjacent to hole 225.

The doubler 208 is fit over the cross angle 206 so that the holes 224 and 225 are aligned with the slot 226 in the cross angle 206. The bolt 218 is fit through the hole 224 in the doubler 208 and through the slot 226 in the cross angle 206 and though the other hole 225 in the doubler 208. The cross angle 206 and doubler 208 can then be moved up and down with respect to each other as limited by the bolt 218 contacting the sides of the slot and top end 228 and bottom end 230 of the cross angle 206.

Because the stop blocks 214 and the lip keepers 212 are connected to the doubler 208, the stop blocks 214 and the lip keepers 212 move as a unit with the doubler 208 as it moves along the cross angle 206 as permitted by the geometry of the slot 226. Once the cross angle 206 has achieved a desired position with respect to the doubler 208, the fastener system 210 is tightened to secure the doubler 208 to the cross angle 206.

In some embodiments of the invention, the doubler 208 is welded to the cross angle 206. The fastener system 210 is used to hold the doubler 208 in place during the welding process. In some embodiments of the invention, the stop block legs 215 (see FIG. 19 for example) are welded to the support blocks 216.

It is appreciated that the gap 236 (See FIG. 19) between the doubler 208 and the cross angle 206, and the size of the gap 238 between the stop block legs 215 and the cross angle 206 varies depending where the cross angle 206 is moved along the doubler 208. For example, the gaps 236 and 238 are absent in FIGS. 20 and 21 when the doubler 208 is fully lowered with respect to the cross angle 206.

It will be appreciated that some embodiments of the invention can reverse parts. For example, the slot can occur in either the pit supported portion of the frame or the deck supporting portion and the hole can occur in either the pit supported portion or the deck supporting portion of the frame in accordance with the invention as evident by comparing the embodiments shown in FIGS. 1-13, 14-17 and 18-23.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A dock leveler frame comprising:
a pit supported portion;
a deck supporting portion configured to provide support to a deck portion of the dock leveler; and
a fastener configured to fit in a corresponding structure on the pit supported portion and deck supporting portion, the corresponding structure configured to allow the pit supported portion and deck supporting portion to be fastened to each other via the fastener at multiple positions with respect to each other; wherein the corresponding structure includes structure defining a hole and a slot and the member defining the slot is spaced above a lowest portion of the pit supported portion.

2. The dock leveler frame of claim 1, wherein the deck supporting portion, the pit supported portion and the hole and slot are dimensioned to permit the fastener to be in the hole and slot when the deck is level with a dock floor when the dock leveler is installed in a pit.

3. The dock leveler frame of claim 1, wherein the hole is located on one of the pit supported portion and the deck supporting portion and the slot is located on the other of the pit supported portion and the deck supporting portion.

4. The dock leveler frame of claim 1, wherein the fastener can be loosened to permit adjustment of the pit supported portion and the deck supporting portion with respect to each other and tightened to secure the deck supporting portion with respect to the pit supported portion.

5. The dock leveler frame of claim 1, further comprising a securing structure on the pit supported portion and the deck supporting portion configured to be welded thereby fixing the pit supported portion to the deck supporting portion.

6. The dock leveler frame of claim 1, further comprising:
a second pit supported portion;
a second deck supporting portion configured to provide support to the deck portion of the dock leveler; and
a second fastener configured to contact corresponding structure on the second pit supported portion and second deck supporting portion, the corresponding structure configured to allow the second pit supported portion and second deck supporting portion to be fastened to each other via the fastener at multiple positions with respect to each other.

7. The dock leveler frame of claim 6, wherein the pit supported portion and deck supporting portion and the fastener are separately adjustable from the second pit supported portion, second deck supporting portion and the second fastener so that the deck can be made level by separate adjustment.

8. The dock leveler of claim 1, further comprising a lip keeper comprising at least a portion of the deck supporting portion.

9. The dock leveler frame of claim 8, wherein the lip keeper is offset from where the lip keeper is attached to the frame.

10. The dock leveler frame of claim 8, further comprising a U-shaped adjustment shoe comprising at least part of the pit supported portion.

11. The dock leveler frame of claim 1, further comprising a saddle support comprising at least part of the deck supporting portion, the saddle support configured to support a support leg that in turn supports the deck.

12. The dock leveler frame of claim 11, further comprising an adjustment angle defining, at least part, the corresponding structure.

13. The dock leveler frame of claim 11, further comprising a second adjustment angle defining, at least in part, the corresponding structure.

14. The dock leveler frame of claim 13, further comprising a second fastener for fastening the second adjustment angle to the saddle support, the fastener for fastening the adjustment angle to the saddle support, wherein the fastener and the second fastener are separately adjustable to assist in allowing the saddle support to be secured in a desired orientation.

15. The dock leveler frame of claim 1, further including a deck pivotally connected to the frame.

16. The dock leveler frame of claim 1, wherein the corresponding structure includes structure defining a moveable saddle constrained by a fastener allowing orthogonal adjustment of the saddle relative to the frame member to account for variances in height of a pit floor.

17. The dock leveler frame of claim 16, wherein the deck supporting portion, the pit supported portion and a hole and a slot are dimensioned to allow rotation of the saddle relative to the frame to account for variances in slope of a pit.

18. A dock leveler frame comprising:
a pit supported portion;
a deck supporting portion configured to provide support to a deck portion of the dock leveler; and
means for connecting the pit supported portion and deck supporting portion, the means for connecting configured to allow the pit supported portion and deck supporting portion to be connected to each other at multiple positions with respect to each other wherein the means for connecting includes structure defining a hole and a slot and a means for fastening configured to extend through the hole and slot and the structure defining the slot is spaced above a lowest portion of the pit supported portion.

19. A method of configuring a dock leveler frame to install a dock leveler in a pit and have a level deck without the use of shims comprising:
providing a pit supported portion of a dock lever frame;
placing a deck supporting portion of the frame in a desired position with respect to the pit supported portion; and
fastening the pit supported portion to the deck supporting portion with a fastener inserted into a hole and a slot wherein the structure defining the slot is spaced above a lowest portion of the pit supported portion of the dock leveler frame.

20. The method of claim 19, further comprising loosing the fastener before placing the deck supporting portion of the frame is the desired position.

21. The method of claim 19, further comprising welding the pit supported portion to the deck supporting position.

22. The method of claim 19, further comprising:
providing a second pit supported portion;
placing a second deck supporting portion of the frame is a desired position with respect to the second pit supported portion; and
fastening the second pit supported portion to the second deck supporting portion with a second fastener inserted in to a second hole and a second slot.

23. The method of claim 19, wherein the desired position is a position that causes the deck of the dock leveler to be level with a dock floor when the deck is supported by the deck supporting portion of the frame.

24. The method of claim 19, further comprising supporting the deck by placing a lip into a lip keeper.

25. The method of claim 19, further comprising supporting the deck by placing a support leg in to a support saddle.

26. The method of claim 19, further comprising sliding the pit supported portion and the deck supporting portion with respect to each other.

* * * * *